F. J. BRAYTON.
MILK STRAINER.
APPLICATION FILED OCT. 11, 1912.
1,070,322.
Patented Aug. 12, 1913.
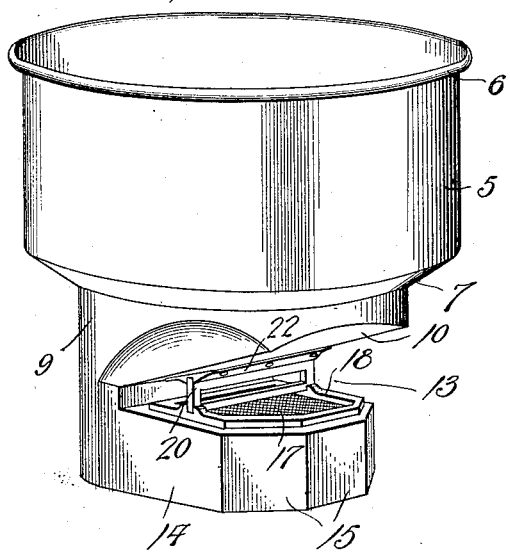
Fig. 1.
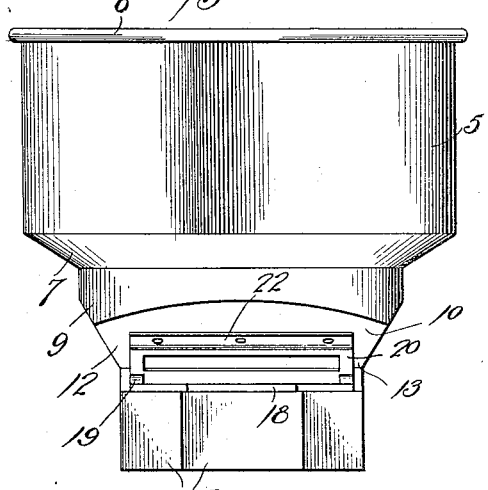
Fig. 3.
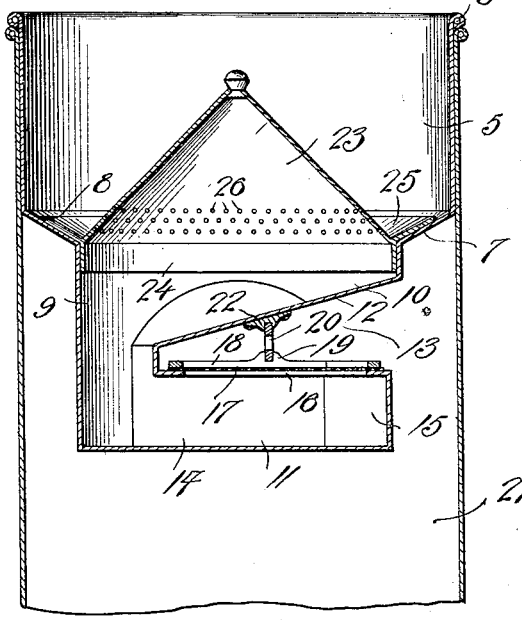
Fig. 4.
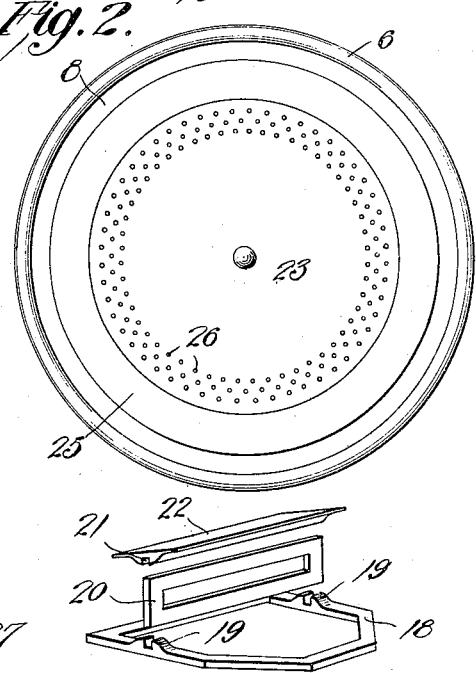
Fig. 2.
Fig. 5.
Witnesses
Carroll Bailey
F. O. Parker
Inventor
Frederick J. Brayton,
By Victor J. Evans
Attorney

UNITED STATES PATENT OFFICE.

FREDERICK J. BRAYTON, OF OKLAHOMA, OKLAHOMA.

MILK-STRAINER.

1,070,322.  Specification of Letters Patent.  Patented Aug. 12, 1913.

Application filed October 11, 1912.  Serial No. 725,267.

*To all whom it may concern:*

Be it known that I, FREDERICK J. BRAYTON, a citizen of the United States, residing at Oklahoma, in the county of Oklahoma and State of Oklahoma, have invented new and useful Improvements in Milk-Strainers, of which the following is a specification.

The invention relates to a milk strainer and has for its primary object to provide a strainer in which milk will be rendered free from coarse or foreign matter prior to its deposit within a receiver thereby assuring the milk thoroughly sanitary and avoiding the pouring of the milk from one receptacle to another for the straining thereof in the ordinary well-known manner.

Another object of the invention is the provision of a strainer of this character in which the coarse matter will be initially removed from the milk and delivered into the strainer and subsequently all foreign matter extracted before the milk is delivered into the receptacle for containing the same, and also which will eliminate the pressure by overflowing, the strainer being formed with a settling well for the milk.

A further object of the invention is the provision of a strainer of this character in which fluid may be rendered clean prior to its deposit within a receptacle which will minimize the handling of the milk and the delay in the straining thereof as is occasioned when straining it in the ordinary well-known manner.
A still further object of the invention is the provision of a strainer which is simple in construction, readily and easily cleaned, reliable and efficient in its operation, and inexpensive in manufacture.
With these and other objects in view the invention consists in the construction, combination and arrangement of parts as will be hereinafter more fully described, illustrated in the accompanying drawing, and pointed out in the claims hereunto appended.

In the drawing:—Figure 1 is a perspective view of a strainer constructed in accordance with the invention. Fig. 2 is a top plan view thereof. Fig. 3 is the front elevation. Fig. 4 is a vertical longitudinal sectional view through the strainer and a receptacle in which the same is mounted for receiving the milk after being strained.
Fig. 5 is a perspective view of the clamp for the strainer rack or cloth, the parts being shown separated.

Similar reference characters indicate corresponding parts throughout the several views in the drawing.

Referring to the drawings by numerals the strainer comprises a cylindrical body 5 provided at its mouth with a bead 6 while its opposite end is formed with a contracted portion 7 providing an annular shoulder 8 interiorly thereof, and depending from this contracted portion 7 is a neck 9 formed with a hopper-shaped lower end 10 communicating with a well 11 formed thereon, the latter projecting laterally beneath the inclined surface 12 of the said hopper-shaped end 10 of the neck 9 so as to form a flared gap or space 13 therebetween, the well 11 being of elongated shape having flat sides 14 and beveled corners 15 at one end edge thereof, or in other words at the portion projected beneath the inclined surface 12 of the hopper-shaped end 10 of the neck. Formed in the top of the well 11 is an outlet opening 16 having overlying the same a strainer rag or fabric 17 which is held in proper position by means of a clamp presently described.

The clamp comprises a base frame 18 adapted to be superimposed upon the strainer rag or fabric 17 when stretched across or closing the opening 16, and is formed at diametrically opposite points rising from the sides thereof with notched lugs 19 in which is engaged an elongated slide 20 in the form of a frame, the same being engaged in a guide groove 21 formed in a keeper bar 22 which is fixed to the inclined surface 12 of the hopper end 10 of the neck for the mounting of the clamp in the space or gap 13 between said surface 12 and the top of the well 11. The frame 18 of the clamp has its open center registering with the opening 16 in the top of the well so that the frame rests upon the said top about the opening 16 therein.

Removably inserted within the top 5 is a strainer cone 23, the same being formed with a depending rim 24 adapted to telescope within the upper end of the neck 9, while projecting outwardly from the said cone 23 is an annular flange 25 adapted to rest upon the shoulder 8 formed by the contracted portions 7 of the body 5. The strainer cone 23 is formed with spaced rows of orifices 26 which permits the fluid to pass through the cone into the neck 9 and into the well 11, whereupon the fluid will flow through the strainer rag or fabric 17 for the deposit thereof in the receptacle 27 when the strainer has been inserted in the mouth thereof as shown in Fig. 4 of the drawing. It will be seen that the milk will be freed from coarse matter when passing through the strainer cone 23 and allowed to settle within the well, so that all foreign matter will be subsequently removed from the milk when it passes through the strainer rag or fabric 17 prior to the flowing of the milk into the receptacle 27 for containing the same. During the course of the milk through the strainer the same will be freed from coarse and foreign matter, thereby avoiding the necessity of subjecting the milk to the ordinary straining process. Furthermore, when straining the milk in a manner as heretofore stated it will avoid the necessity of pouring such milk from one receptacle to another for the straining thereof in the ordinary well-known manner.

What is claimed is:—

1. A strainer comprising a body having a contracted neck depending therefrom provided with a closed bottom, the said neck being formed with an instruck portion providing a gap opening through one side thereof, a perforated cone fitted in the neck above the gap and extended upwardly in the body, the lowermost wall of said gap being provided with a perforation, a strainer fabric overlying said perforation, and means located within the gap and engageable with the fabric for holding the same taut.

2. A strainer comprising a body having a contracted neck depending therefrom provided with a closed bottom, the said neck being formed with an instruck portion providing a gap opening through one side thereof, a perforated cone fitted in the neck above the gap and extended upwardly in the body, the lowermost wall of said gap being provided with a perforation, a strainer fabric overlying said perforation, a frame having an open center superimposed upon the fabric concentrically with respect to the opening in the lowermost wall of the gap, a keeper bar fixed to the uppermost wall of the gap, and a slide detachably engaging the keeper bar and frame for holding the latter in clamping relation with respect to the fabric.

In testimony whereof I affix my signature in presence of two witnesses.

FREDERICK J. BRAYTON.

Witnesses:
O. F. EVERSOLE,
N. A. JONES.

Copies of this patent may be obtained for five cents each, by addressing the "Commissioner of Patents, Washington, D. C."